(12) United States Patent
Feng et al.

(10) Patent No.: US 9,843,616 B2
(45) Date of Patent: Dec. 12, 2017

(54) METHOD, APPARATUS AND SYSTEM FOR SHARING WEBPAGE

(71) Applicant: Tencent Technology (Shenzhen) Company Limited, Shenzhen (CN)

(72) Inventors: Cheng Feng, Guangdong (CN); Tingyong Tang, Guangdong (CN); Zhipei Wang, Guangdong (CN); Hao Tang, Guangdong (CN); Xi Wang, Guangdong (CN); Kai Zhang, Guangdong (CN); Xin Qing, Guangdong (CN); Sirui Liu, Guangdong (CN); Huijiao Yang, Guangdong (CN); Ying Huang, Guangdong (CN); Yulei Liu, Guangdong (CN); Wei Li, Guangdong (CN); Bo Hu, Guangdong (CN); Ruiyi Zhou, Guangdong (CN); Lei Guan, Guangdong (CN); Bosen He, Guangdong (CN); Ning Ma, Guangdong (CN); Yang Li, Guangdong (CN); Yingge Li, Guangdong (CN); Lei Zheng, Guangdong (CN); Zhenan Guan, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 353 days.

(21) Appl. No.: 14/316,324

(22) Filed: Jun. 26, 2014

(65) Prior Publication Data
US 2015/0006671 A1    Jan. 1, 2015

Related U.S. Application Data

(63) Continuation of application No. PCT/CN2014/070437, filed on Jan. 10, 2014.

(30) Foreign Application Priority Data

Jun. 28, 2013    (CN) .......................... 2013 1 0271864

(51) Int. Cl.
*H04L 29/08*    (2006.01)
*H04W 4/00*    (2009.01)
(Continued)

(52) U.S. Cl.
CPC ............ *H04L 67/02* (2013.01); *G06F 3/0346* (2013.01); *G06F 3/0488* (2013.01);
(Continued)

(58) Field of Classification Search
CPC ....... H04L 67/02; H04L 67/14; G06F 3/0346; G06F 3/0488; G06F 17/30899; H04W 4/008; H04W 4/023; H04W 4/206
See application file for complete search history.

(56) References Cited

U.S. PATENT DOCUMENTS 8,850,045 B2 *    9/2014    Berg ....................... H04L 63/08
                                                                709/225
9,113,320 B2 *    8/2015    Litvin ..................... G06F 21/41
(Continued)

FOREIGN PATENT DOCUMENTS

| CN | 101751351 A | 6/2010 |
|---|---|---|
| CN | 102325271 A | 1/2012 |

(Continued)

OTHER PUBLICATIONS

International Search Report dated Apr. 22, 2014 for International Application No. PCT/CN2014/070437, 3 pages.
(Continued)

*Primary Examiner* — Uzma Alam
(74) *Attorney, Agent, or Firm* — Brinks Gilson & Lione

(57) ABSTRACT

A webpage sharing method, an apparatus and a system are disclosed, the method includes: acquiring, by a device with
(Continued)

memory and at least one processor, a webpage sharing instruction, acquiring an terminal identification (ID) corresponding to a terminal according to the webpage sharing instruction, acquiring a webpage identifier that identifies at least a portion of the webpage, and transmitting the webpage identifier to an event monitoring process that is associated with a web browser in the terminal corresponding to the ID. The above page sharing method, apparatus and system enable a user to operate without need to additionally open an instant messaging tool so as to avoid extra memory usage, increase memory utilization and improve the running speed of a mobile device.

14 Claims, 11 Drawing Sheets

(51) Int. Cl.
  *H04W 4/02* (2009.01)
  *H04W 4/20* (2009.01)
  *G06F 3/0346* (2013.01)
  *G06F 3/0488* (2013.01)
  *G06F 17/30* (2006.01)
(52) U.S. Cl.
  CPC ........ *G06F 17/30899* (2013.01); *H04L 67/14* (2013.01); *H04W 4/008* (2013.01); *H04W 4/023* (2013.01); *H04W 4/206* (2013.01)

(56) References Cited

U.S. PATENT DOCUMENTS

| | | | |
|---|---|---|---|
| 9,198,214 B2* | 11/2015 | Hertel | |
| 2009/0111378 A1* | 4/2009 | Sheynman | H04W 8/005 455/41.1 |
| 2010/0174801 A1* | 7/2010 | Tabaaloute | H04L 12/2812 709/217 |
| 2010/0265623 A1* | 10/2010 | Stenstrom | H01C 7/123 361/56 |
| 2011/0076941 A1* | 3/2011 | Taveau | G06Q 10/10 455/41.1 |
| 2011/0210820 A1* | 9/2011 | Talty | G06K 7/10237 340/5.8 |
| 2012/0284012 A1* | 11/2012 | Rodriguez | G06Q 30/06 704/1 |
| 2013/0048721 A1* | 2/2013 | Rasband | G06F 17/30879 235/383 |
| 2013/0097239 A1* | 4/2013 | Brown | H04L 67/02 709/204 |
| 2013/0103797 A1 | 4/2013 | Park et al. | |
| 2014/0181691 A1* | 6/2014 | Poornachandran | H04W 4/008 715/753 |
| 2014/0191988 A1* | 7/2014 | Corrion | G06F 3/044 345/173 |
| 2014/0256250 A1* | 9/2014 | Cueto | H04B 5/0031 455/41.1 |
| 2014/0317708 A1* | 10/2014 | Adrangi | H04B 5/00 726/7 |

FOREIGN PATENT DOCUMENTS

| | | |
|---|---|---|
| CN | 102340540 A | 2/2012 |
| CN | 102546835 A | 7/2012 |
| CN | 103139382 A | 6/2013 |

OTHER PUBLICATIONS

Written Opinion dated Apr. 16, 2014 for International Application No. PCT/CN2014/070437, 5 pages.
Search Report for China Application No. 201 31 0271 8642 dated Feb. 16, 2015, without an English translation (2 pp.).
First Office Action received from the State of Intellectual Property of People's Republic of China for Application No. 2013102718642 dated Mar. 2, 2015, without an English translation (8 pp.).

* cited by examiner

METHOD, APPARATUS AND SYSTEM FOR SHARING WEBPAGE

CROSS-REFERENCE TO RELATED APPLICATIONS

This application is a continuation of International Application No. PCT/CN2014/070437, filed on Jan. 10, 2014, which claims priority to Chinese Patent Application No. 201310271864.2, filed on Jun. 28, 2013, both of which are hereby incorporated herein by reference in their entireties.

FIELD OF THE TECHNOLOGY

The present disclosure relates to the field of Internet technology, and particularly to a webpage sharing method, apparatus and system.

BACKGROUND

With the development of the mobile Internet technology, more and more users visit the Internet and browser web webpages via mobile devices, such as a smart phone or a tablet personal computer (PC).

SUMMARY

This disclosure provides a webpage sharing method which may increase the memory utilization. The webpage sharing method includes steps of: acquiring, by a device with memory and at least one processor, a webpage sharing instruction; acquiring, by the device, a terminal identification (ID) corresponding to a terminal according to the webpage sharing instruction; acquiring, by the device, a webpage identifier that identifies at least a portion of the webpage; and transmitting, by the device, the webpage identifier to an event monitoring process that is associated with a web browser in the terminal corresponding to the terminal ID.

Also, the disclosure provides a webpage sharing apparatus which includes: memory; one or more processors; an instruction acquiring module stored in memory and to be executed by one or more processors that is configured to acquire a webpage sharing instruction; a terminal acquiring module stored in memory and to be executed by one or more processors that is configured to acquire a terminal identification (ID) according to the webpage sharing instruction; a link acquiring module stored in memory and to be executed by one or more processors that is configured to acquire a webpage identifier that identifies at least a portion of the webpage; a link transmitting module stored in memory and to be executed by one or more processors that is configured to transmit the webpage identifier to an event monitoring process that is associated with a web browser in the terminal corresponding to the terminal ID.

Moreover, a method is also provided for sharing a webpage. The method includes: acquiring, by a transmitting terminal having memory and one or more processors, a webpage sharing instruction, acquiring, by the transmitting terminal, a receiving terminal having memory and one or more processors according to the webpage sharing instruction, acquiring, by the transmitting terminal, a webpage identifier that identifies at least a portion of the webpage in a browser and transmitting, by the transmitting terminal, the webpage identifier to the receiving terminal; and receiving, by the receiving terminal, the webpage identifier and loading, by the transmitting terminal, a webpage corresponding to the webpage identifier.

A webpage sharing system is provided in this disclosure, which includes: memory; one or more processors; a transmitting terminal; and a receiving terminal which the transmitting terminal having memory and to be executed by processors is configured to: acquire a webpage sharing instruction, acquire the receiving terminal according to the webpage sharing instruction, acquire a webpage identifier that identifies at least a portion of the webpage in a browser, and transmit the webpage identifier to the receiving terminal; which the receiving terminal having memory and to be executed by processors is configured to: receive the webpage identifier, and load a webpage corresponding to the webpage identifier.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
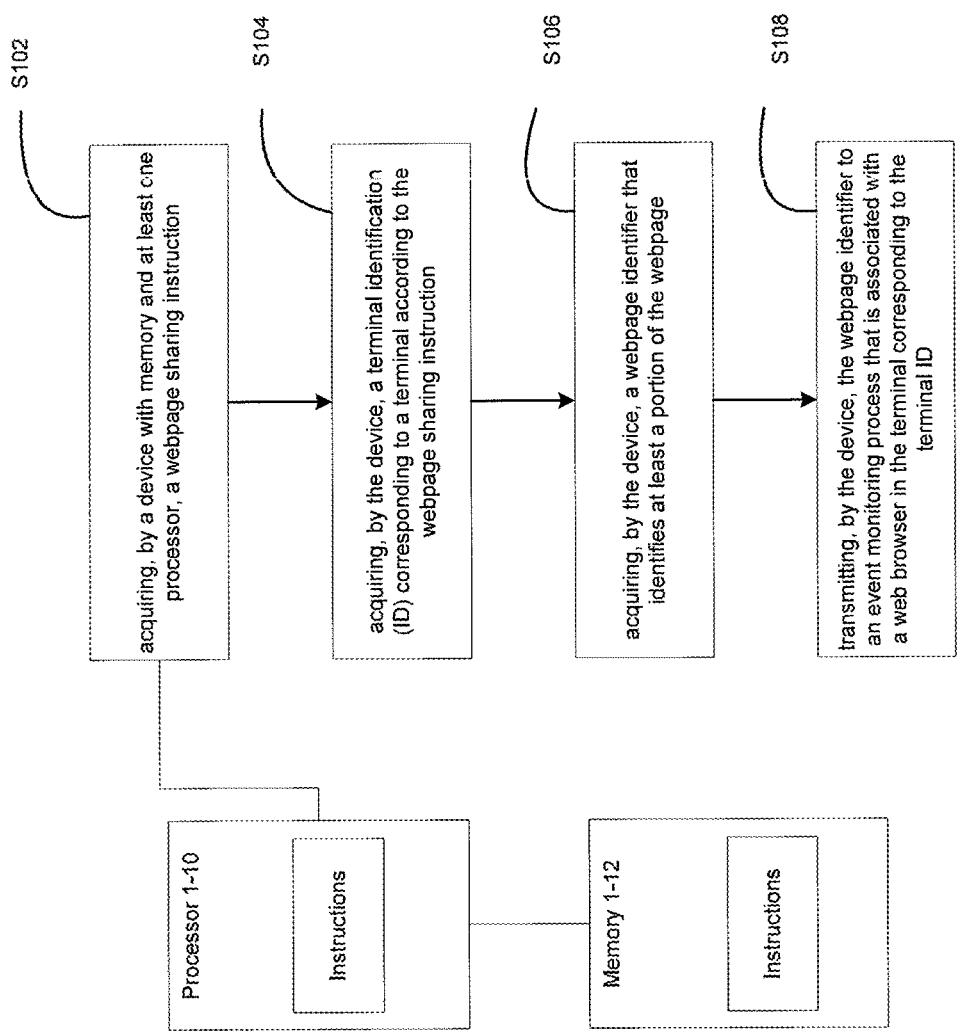
FIG. 1 shows a flow diagram of a webpage sharing method.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

Through related studies, it has found that on the basis of the traditional technology, when a user wants to share a webpage in a browser with other users, the user usually needs to start an instant messaging tool on the mobile device so as to share a link to the webpage with other good friends through the instant messaging tool.

For the mobile device with a relatively small memory, the additionally started instant messaging tool will occupy an additional memory space, which causes the memory utilization to become relatively low and reduces the running speed of the mobile device.

As shown in FIG. 1, a webpage sharing method is disclosed, this method is completely dependent on a computer program, this computer program can be run on any devices based on a Von Neumann System having memory 1-12 and one or more processors 1-10, such as the smart phone, the tablet PC, and intelligent glasses, and this method comprises:

Step S102: acquiring, by a device with memory 1-12 and at least one processor 1-10, a webpage sharing instruction.

The webpage sharing instruction is an instruction which has been input by the user and is configured to trigger a webpage sharing operation.

In one example, the user can input the webpage sharing instruction through clicking on or touching a function key. For example, in one application scenario, the running of this method is based on the browser in the smart phone, a sharing button can be set in a toolbar of the browser, and the user can input the webpage sharing instruction through clicking on this button.

In another example, before acquiring the webpage sharing instruction, it is also feasible to detect the shake operation or collision operation through the acceleration sensor and to generate the webpage sharing instruction according to the shake operation or collision operation which has been detected. The acceleration sensor is a gravity sensor and one of common sensors equipped for the smart phone. The acceleration sensor can detect any change in the acceleration of the mobile device in motion, so it can sense the operation of shaking the mobile device and the event of the collision relating to the mobile device.

Figure 2:
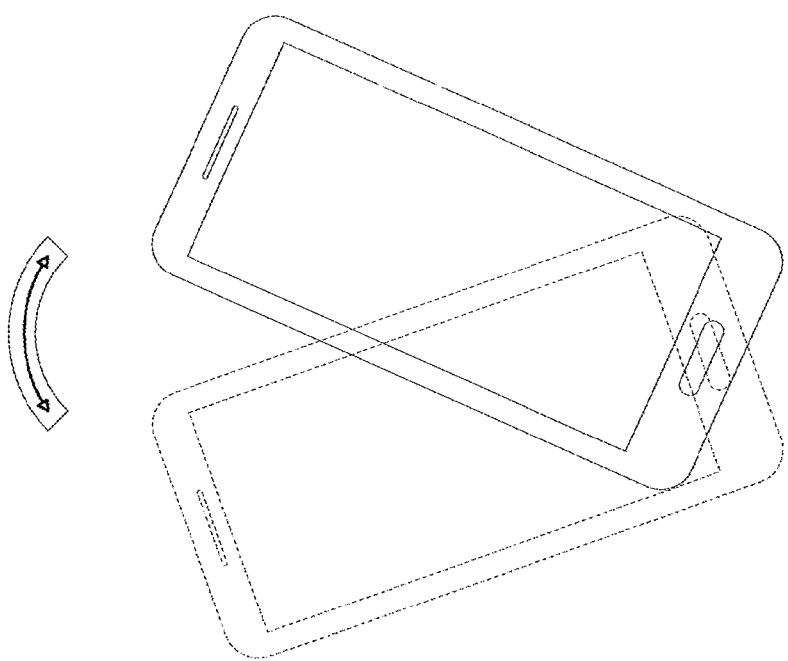
FIG. 2 shows a schematic diagram of an operation process of a shake operation.
Figure 3:
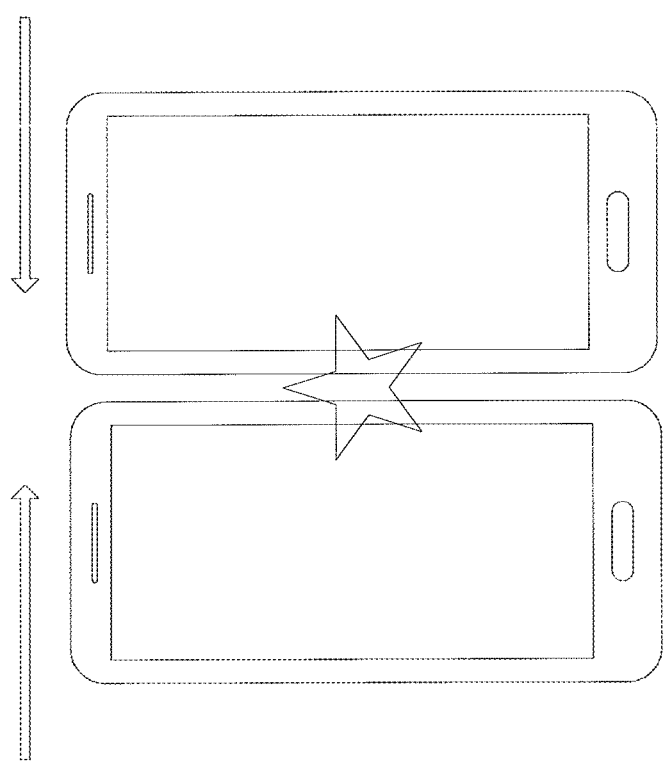
FIG. 3 shows a schematic diagram of an operation process of a collision event.

In the application scenario which this example corresponds to, as shown in FIG. 2 and FIG. 3, the user has no need to click on the button in the browser and only needs to shake the smart phone or make the smart phone collide with any other smart phone so as to be able to input the webpage sharing instruction. Preferentially, it is feasible to select the shake or collision operation according to frequency and amplitude of the shake so as to prevent any incorrect operation caused due to the shake of a knapsack when the smart phone is placed into the knapsack.

Moreover, the sharing instruction may be divided into two categories: (1) there is bonding relationship among devices to share the webpage. For example, after logging in, an user may share webpage between mobile device and PC or between one PC to another PC. The user may have the option to select a particular device to share the webpage. (2) non-bonding relationship among devices to share webpage. For example, the sharing relationship among devices may be established via sound, bar code, touching among each other or any other methods, either currently known or later developed.

Step S104: acquiring, by the device, a terminal identification (ID) corresponding to a terminal according to the webpage sharing instruction.

The terminal ID is ID information of the terminal and can be an IP address, a terminal name, a network card number of the terminal, etc.

In one example, it is feasible to acquire the terminal ID which has been obtained from the detection by the near field communication component. The near field communication (NFC) is a type of non-contact identification and interconnection technology, and it can realize the NFC among mobile devices, consumer electronics, PCs and intelligent control tools. The near field communication component (hereinafter referred to as the NFC component) includes a NFC chip and its corresponding driver in the smart phone. In this example, after the webpage sharing instruction has been acquired, the driver of the NFC chip is immediately called to detect whether there is a corresponding mobile device, which has been installed with the NFC chip, around the smart phone or not, if detected, then an ID number of the detected device will be acquired as the terminal ID.

Step S106: acquiring, by the device, a webpage identifier that identifies at least a portion of the webpage. The webpage identifier may be an address in the address bar of the browser or may be some other forms to identify at least a portion of the webpage, either currently known or later developed. The webpage identifier may only identify a portion or the whole webpage. When the webpage identifier only identifies a portion of the webpage, only the portion of the webpage is identified may be shared.

The webpage identifier may be the webpage address. The transmitting, by the device, the webpage identifier to an event monitoring process that is associated with a web browser in the terminal corresponding to the terminal ID webpage identifier in the address bar of the browser is the link address which the webpage that the user currently browses in the browser corresponds to. At the time of displaying the webpage, the browser usually displays the webpage identifier, which the current webpage corresponds to, in the address bar of the browser. In other examples, it is also feasible to acquire the webpage identifier, which the webpage in a state of focus corresponds to, through reading the browser's cache.

The webpage identifier that has been acquired is the webpage identifier which the webpage in the state of focus (in a multi-tab or a so-called multi-tag browser, the tab or the tag that is shown in a current display device is the tab or the tag in the state of focus, and the webpage within it is also in the state of focus) corresponds to.

Step S108: transmitting, by the device, the webpage identifier to an event monitoring process that is associated with a web browser in the terminal corresponding to the terminal ID.

In this example, the terminal ID is sensed by the NFC component, and the webpage identifier can be transmitted to the browser event monitoring process of the terminal, which the terminal ID that has been sensed corresponds to, through the NFC component. The browser event monitoring process is a background process which is run at this terminal, and it can have a corresponding port of the browser event monitoring process and transmit the webpage identifier to the port of the browser event monitoring process of this terminal through the NFC component so as to realize the monitoring of the browser event monitoring process.

This terminal also receives this webpage identifier through the NFC component and then transmits the webpage identifier to the browser event monitoring process which is run by it, and the browser event monitoring process loads the webpage, which this webpage identifier corresponds to, through calling a corresponding event processing function. In this example, if a browser application in this terminal which has received the webpage identifier is not started, then a notification message will be prompted in a task bar. The user can start the browser and load the corresponding webpage, which the webpage identifier corresponds to, through clicking on this notification message.

For example, in one application scenario, a user A browses a webpage, the link address of which is "http://www.qq.com", in a smart phone held by the user. If the user A hopes to share this webpage with a nearby user B, then the user A can make the smart phone held by the user A collide with the smart phone held by the user B, the webpage sharing instruction has been input through the collision, and after the smart phone held by the user A has acquired the webpage sharing instruction, which has been input, through detecting the collision event, it calls a detection function of the NFC component to acquire a nearby terminal so as to acquire the terminal ID (device number, device name, etc.) of the smart phone held by the user B. Then the smart phone held by the user A communicates with the smart phone, which is held by the user B, through the NFC component to transmit the webpage identifier of "http://www.qq.com". After the smart phone held by the user B has received this webpage identifier, its browser event monitoring process loads the webpage of "http://www.qq.com" in the browser through calling the corresponding event processing function.

If the smart phone held by the user B does not start the browser, then the browser event monitoring process that is run on it will show a corresponding notification in the task bar of this smart phone to prompt the user B that the webpage identifier of "http://www.qq.com" shared by the user A has been received, and the user B can start the browser and load the corresponding webpage through clicking on this prompt message.

In another example, the step of transmitting the webpage identifier to the browser event monitoring process of the terminal which corresponds to the terminal ID can comprise:

acquiring the network address, which corresponds to the terminal ID, and the port of the browser event monitoring process; transmitting the webpage identifier to the network address and the port of the browser event monitoring process through the Wi-Fi component.

The Wi-Fi component is a component configured to transmit data according to a Wi-Fi communication protocol. In this example, it is feasible to acquire the IP address, which the terminal ID corresponds to, and the port of the browser event monitoring process and transmit the webpage identifier to this IP address and the port of the browser event monitoring process in the form of socket through the Wi-Fi component.

Further, before the step of transmitting the webpage identifier to the network address through the Wi-Fi component, it is also feasible to determine whether the network address which corresponds to the terminal ID is located in the subnet or not, if not, then to create the Wi-Fi hotspot through the Wi-Fi component, to establish the connection with the terminal through the Wi-Fi hotspot and to execute the step of transmitting the webpage identifier to the network address and the port of the browser event monitoring process through the Wi-Fi component.

If the network address that corresponds to the terminal ID is not in the subnet where the smart phone held by the sharer is located, then the webpage identifier can only be forwarded for multiple times in a WAN so as for the transmission to be completed. However, if it is feasible to establish the connection with the terminal through the Wi-Fi hotspot so as to realize the transmission, then the data are not necessary to be forwarded for multiple times in the process of the transmission, thus improving the transmission speed.

In one example, after the step of acquiring the webpage identifier in the address bar of the browser, it is also feasible to determine whether the webpage identifier corresponds to the local file or not, if yes, then to acquire the local file which corresponds to the webpage identifier and to transmit the local file to the browser event monitoring process of the terminal which corresponds to the terminal ID; if not, then to execute the step of transmitting the webpage identifier to the browser event monitoring process of the terminal which corresponds to the terminal ID.

Under normal conditions, the browser can be configured to open the webpage of a web webpage and also the webpage of a local document or a local picture. For example, the user can drag the local picture into the browser to open the picture so as to show this picture in the webpage; the user can also drag the file, such as a PDF document, into the browser to open and browse the file.

In this example, it is feasible to determine whether the webpage identifier corresponds to the local file according to a protocol type of the webpage identifier. If the webpage shown in the browser is the local document or the local picture, then the webpage identifier is a local storage path of this local document or local picture, and the protocol type is "file: ///", i.e., the webpage identifier uses the "file: ///" as its beginning character. If the webpage shown in the browser is the web webpage, then the protocol type is generally "http: //" or "https: //", i.e., with the "http: //" or "https: //" as the beginning character.

Before transmitting the webpage identifier, first determine this webpage identifier is a local link or a webpage link, if it is the webpage link, then directly transmit this webpage link; if it is the local link, then transmit the local file which the local link corresponds to. The mode of transmitting the local file is the same as the mode of transmitting the webpage identifier, and both the modes are data transmissions. The terminal that receives this local file can also open the local file, which has been received, through the browser.

In one example, before the step of transmitting the webpage identifier to the terminal which corresponds to the terminal ID, it is also feasible to show the terminal ID; to acquire the terminal selecting instruction and to select the terminal ID according to the terminal selecting instruction.

Figure 4:
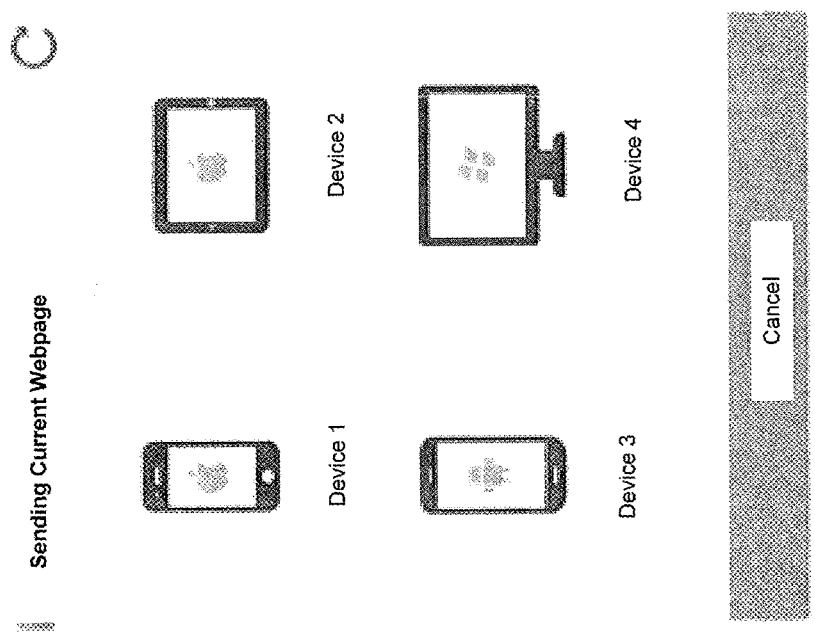
FIG. 4 shows a display diagram of an interface convenient for a user to select a terminal.

As shown in FIG. 4, if there are a plurality of terminal IDs for different devices, which have been acquired, it is feasible to show this plurality of terminal IDs of those devices in the form of a list or title icons, and the user can click to check any of the terminal IDs so as to input the terminal selecting instruction. After having received the terminal selecting instruction which has been input by the user, it is feasible to select the terminal ID, which corresponds to the user's checking operation, by selecting.

In one example, the step of acquiring the corresponding terminal ID according to the webpage sharing instruction comprises:

Acquiring the corresponding user ID according to the webpage sharing instruction, transmitting the query request to the remote server according to the user ID and acquiring the returned terminal ID.

In this example, the user can input the user ID respectively in the browsers of multiple terminals in advance to log into the remote server so that it is feasible to acquire the user ID which has been input and then to log into the remote server according to the user ID which has been input. The session object that corresponds to this user ID can be created in this remote server, and the terminal IDs of all the terminal devices, in which the user that this user ID corresponds to has logged in the remote server, can be stored in this session object. After the remote server has received the query request, it extracts the corresponding user ID, finds the session object which corresponds to this user ID, then reads the terminal ID, which has been stored, in the session object and returns. The terminal ID can be the device number, the device name or the IP address, etc.

For example, in the application scenario which this example corresponds to, the user A can input an account number and a password in the browser of the smart phone in advance to log in (can also automatically log in with the browser which automatically reads a cookie or a configuration file at the time of starting), i.e., to register this smart phone in the remote server; and log in with the same account number and password in a desktop computer, i.e., to register this desktop computer in the remote server. When the user A hopes to synchronize the webpage in the browser of the smart phone onto the browser of the desktop computer for browse in a large-screen mode, then the user A can input the webpage sharing instruction by means of key trigger or shake, and the smart phone of the user A transmits the query request including the user ID of the user A to the remote server and acquires the IP address, which has been returned by the remote server, of the desktop computer so as to be capable of transmitting the webpage identifier, which the webpage corresponds to, to the IP address of this desktop computer.

Further, the step of transmitting the query request to the remote server according to the user ID also comprises:

acquiring the local position information through the position sensor and adding the local position information into the query request.

The step of acquiring the returned terminal ID can be specifically: acquiring the returned terminal ID which corresponds to the local position information.

The position sensor is usually a GPS (Global Positioning System) module in the mobile device. After the remote server has received this query request, it can extract this local position information, acquire other registered terminal IDs at a distance, which is less than a threshold value range, from this local position information and return.

Figure 5:
FIG. 5 shows a display diagram of an interface for displaying a terminal nearby a user.
Figure 5:

For example, as shown in FIG. 5, if the user A hopes to share the current webpage, which the user A is browsing, with any other user who is using the mobile phone to browse the web webpage and whose geographic position is nearby the user A, then the user A can generate a webpage sharing request through shaking the mobile phone, then acquire the IP address, which has been returned by the remote server, of any other registered terminal device, the geographic position of which is at a distance, which is less than the threshold value range, from the user A, and transmit this webpage to the returned IP address.

After the smart phone held by the user A has received the returned IP address, it can show the IP address in the form of a list. As shown in FIG. 5, it is also feasible to acquire the user ID, which the registered terminal device corresponds to, and show any nearby registered terminal device in the form of the user ID. The user A can perform a multi-selection operation in the list, select the terminal, which the user A wants to share, by selecting and click OK, and then the smart phone held by the user A can transmit the webpage identifier to the IP address as per the multi-selection operation by the user A.

Figure 6:
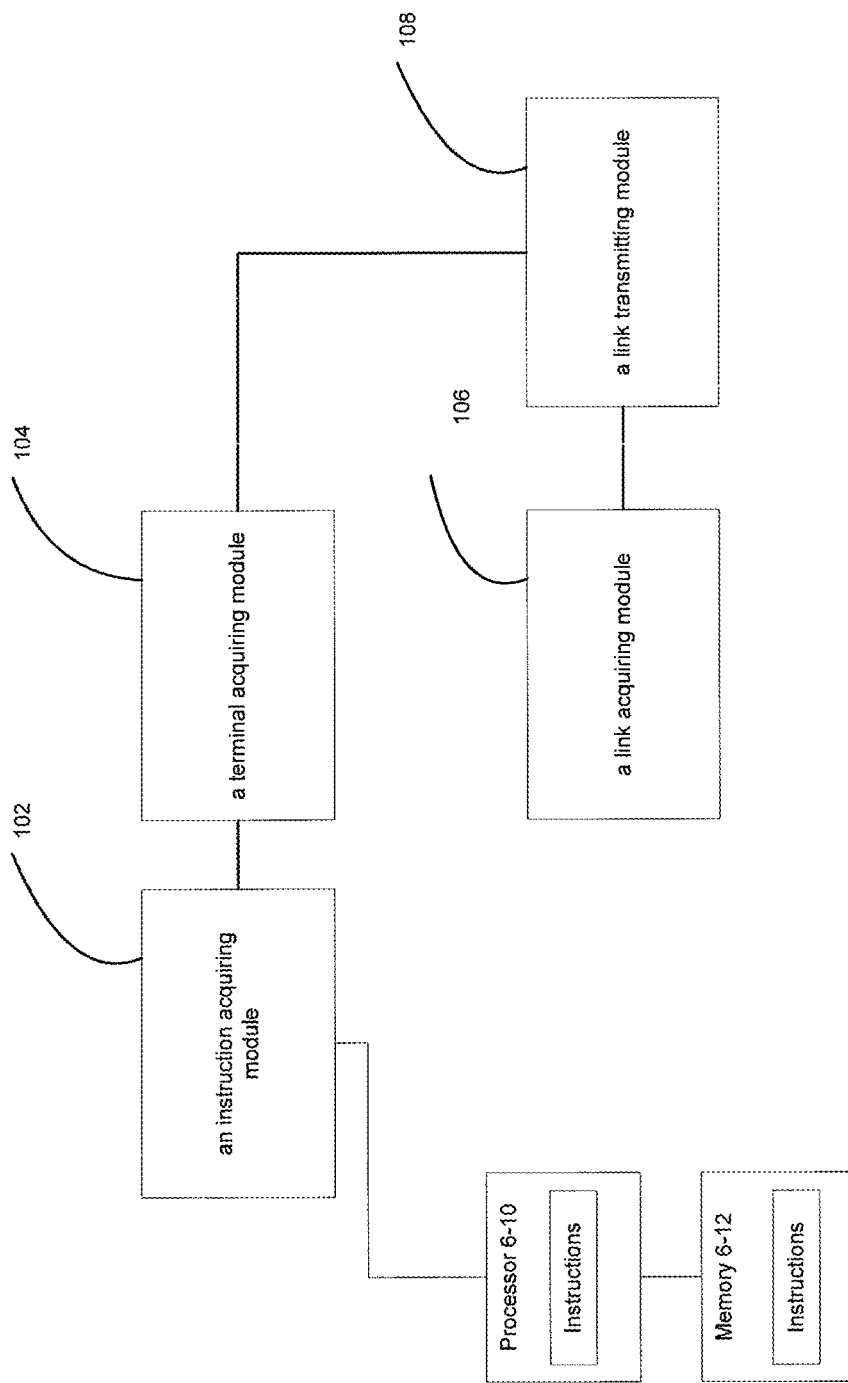
FIG. 6 shows a schematic diagram of a structure of a webpage sharing apparatus.

In one example, as shown in FIG. 6, a webpage sharing apparatus is disclosed, comprising:

an instruction acquiring module 102 having memory 6-12 and to be executed by one or more processors 6-10 that is configured to acquire the webpage sharing instruction;

a terminal acquiring module 104 having memory 6-12 and to be executed by one or more processors 6-10 that is configured to acquire the corresponding terminal ID according to the webpage sharing instruction;

a link acquiring module 106 having memory 6-12 and to be executed by one or more processors 6-10 that is configured to acquire the webpage identifier in the address bar of the browser;

a link transmitting module 108 having memory 6-12 and to be executed by one or more processors 6-10 that is configured to transmit the webpage identifier to the browser event monitoring process of the terminal which corresponds to the terminal ID.

Figure 7:
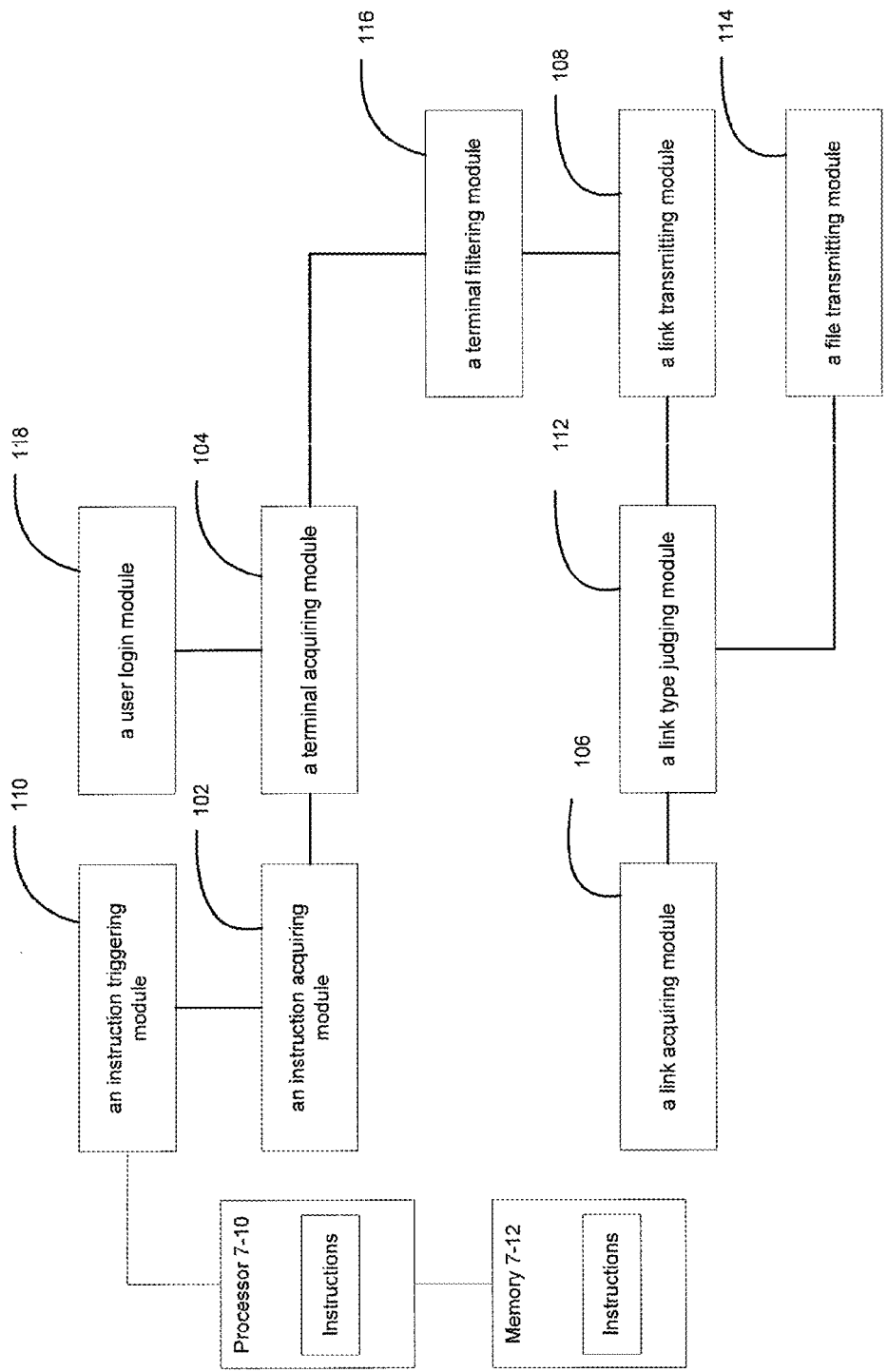
FIG. 7 shows a schematic diagram of a structure of a webpage sharing apparatus.

In one example, as shown in FIG. 7, the webpage sharing apparatus further comprises an instruction trigging module 110 having memory 6-12 and to be executed by one or more processors 6-10 that is configured to detect the shake operation or the collision event through the acceleration sensor and to generate the webpage sharing instruction according to the shake operation or the collision event which has been detected In one example, the terminal acquiring module 104 is also configured to acquire the terminal ID which has been obtained from the detection by the near field communication component.

In one example, the link transmitting module 108 is also configured to transmit the webpage identifier to the browser event monitoring process of the terminal, which corresponds to the terminal ID, through the near field communication component.

In one example, the link transmitting module 108 is also configured to acquire the network address, which corresponds to the terminal ID, and the port of the browser event monitoring process; and to transmit the webpage identifier to the network address and the port of the browser event monitoring process through the Wi-Fi component.

In one example, the link transmitting module 108 is also configured to determine whether the network address which corresponds to the terminal ID is located in the subnet or not, if not, then to create the Wi-Fi hotspot through the Wi-Fi component, to establish a connection with the terminal through the Wi-Fi hotspot and to execute the step of transmitting the webpage identifier to the network address and the port of the browser event monitoring process through the Wi-Fi component.

In one example, as shown in FIG. 7, the webpage sharing apparatus further comprises a link type judging module 112 having memory 7-12 and to be executed by one or more processors 7-10 that is configured to determine whether the webpage identifier corresponds to the local file or not, if not, then to call the link transmitting module.

In one example, as shown in FIG. 7, the webpage sharing apparatus further comprises a file transmitting module 114 having memory 7-12 and to be executed by one or more processors 7-10 that is configured to acquire the local file, which corresponds to the webpage identifier, when the webpage identifier corresponds the local file and to transmit the local file to the browser event monitoring process of the terminal which corresponds to the terminal ID.

In one example, as shown in FIG. 7, the webpage sharing apparatus further comprises a terminal selecting module 116 having memory 7-12 and to be executed by one or more processors 7-10 that is configured to show the terminal ID; to acquire the terminal selecting instruction and to select the terminal ID according to the terminal selecting instruction.

In one example, the terminal acquiring module 104 is also configured to acquire the corresponding user ID according to the webpage sharing instruction; to transmit the query request to the remote server according to the user ID and to acquire the returned terminal ID.

In one example, as shown in FIG. 7, the webpage sharing apparatus further comprises a user login module 118 having memory 7-12 and to be executed by one or more processors 7-10 that is configured to acquire the user ID, which has been input, and to log into the remote server according to the user ID which has been input.

In one example, the terminal acquiring module 104 is also configured to acquire the local position information through the local position sensor and to add the local position information into the query request;

the terminal acquiring module 104 is also configured to acquire the returned terminal ID which corresponds to the local position information.

Figure 8:
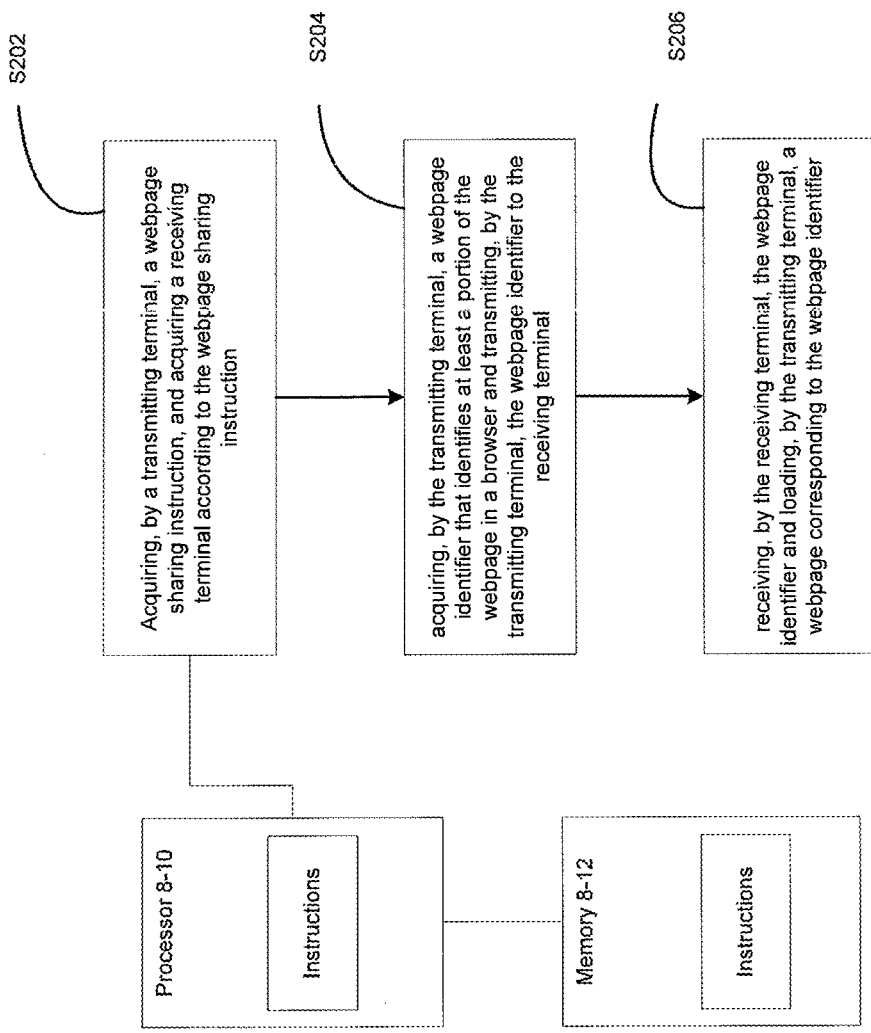
FIG. 8 shows a flow diagram of another example of a webpage sharing method.

In one example, as shown in FIG. 8, another example of a webpage sharing method is disclosed, comprising:

Step S202: Acquiring, by a transmitting terminal having memory 8-12 and to be executed by one or more processors 8-10, a webpage sharing instruction, and acquiring a receiving terminal having memory 8-12 and to be executed by one or more processors 8-10 according to the webpage sharing instruction.

Step S204: acquiring, by the transmitting terminal, a webpage identifier that identifies at least a portion of the webpage in a browser and transmitting, by the transmitting terminal, the webpage identifier to the receiving terminal.

Step S206: receiving, by the receiving terminal, the webpage identifier and loading, by the transmitting terminal, a webpage corresponding to the webpage identifier.

In one example, after the step that the receiving terminal receives the webpage identifier, the method further comprises:

Determining whether the browser has started or not, if not, then displaying the prompt message in the notification bar.

In one example, after the step that the receiving terminal displays the prompt message in the notification bar, the method further comprises:

the receiving terminal acquires the prompt message view instruction which has been input, starts the browser according to the prompt message view instruction and executes the step of loading the webpage, which corresponds to the webpage identifier, through calling the interface function of the browser.

In one example, before the step that the receiving terminal loads the webpage, which corresponds to the webpage identifier, through calling the interface function of the browser, the method further comprises:

Displaying the risk prompt window, acquiring the loading confirmation instruction which has been input and executing the step of loading the webpage, which corresponds to the webpage identifier, through calling the interface function of the browser.

In one example, the step that the transmitting terminal acquires the corresponding receiving terminal according to the webpage sharing instruction comprises:

the transmitting terminal acquires the corresponding user ID according to the webpage sharing instruction, generates the query request according to the user ID and transmits the query request to the remote server;

the remote server extracts the user ID according to the query request which has been received, acquires the session object which the user ID corresponds to, reads the terminal ID, which has been cached in the session object, corresponding to the user ID and returns the terminal ID to the transmitting terminal;

the transmitting terminal receives the terminal ID and acquires the corresponding receiving terminal according to the terminal ID.

In one example, the webpage sharing method further comprises the step that the transmitting terminal and/or the receiving terminal register/registers the device in the remote service, specifically comprising:

the transmitting terminal and/or the receiving terminal acquires the terminal ID and the user ID which has been input, generates the device registration request according to the terminal ID and the user ID and transmits the device registration request to the remote server;

the remote server receives the device registration request, extracts the corresponding user ID and terminal ID, acquires the session object, which corresponds to the user ID, and caches the terminal ID into the session object.

In one example, the step that the transmitting terminal generates the device registration request according to the terminal ID and the user ID further comprises:

the transmitting terminal acquires the local position information through the position sensor and adds the local position information into the device registration request;

the step that the remote server caches the terminal ID into the session object further comprises:

the remote server adds the local position information, which corresponds to the terminal ID, into the session object.

In one example, the step that the transmitting terminal acquires the corresponding receiving terminal according to the webpage sharing instruction further comprises:

the transmitting terminal acquires the local position information through the position sensor, generates the query request according to the local position information and transmits the query request to the remote server;

the remote server extracts the local position information according to the query request which has been received, finds the terminal ID at a geographic distance, which is less than a threshold value, from the local position information through traversing the session object and returns the terminal ID to the transmitting terminal.

Figure 9:
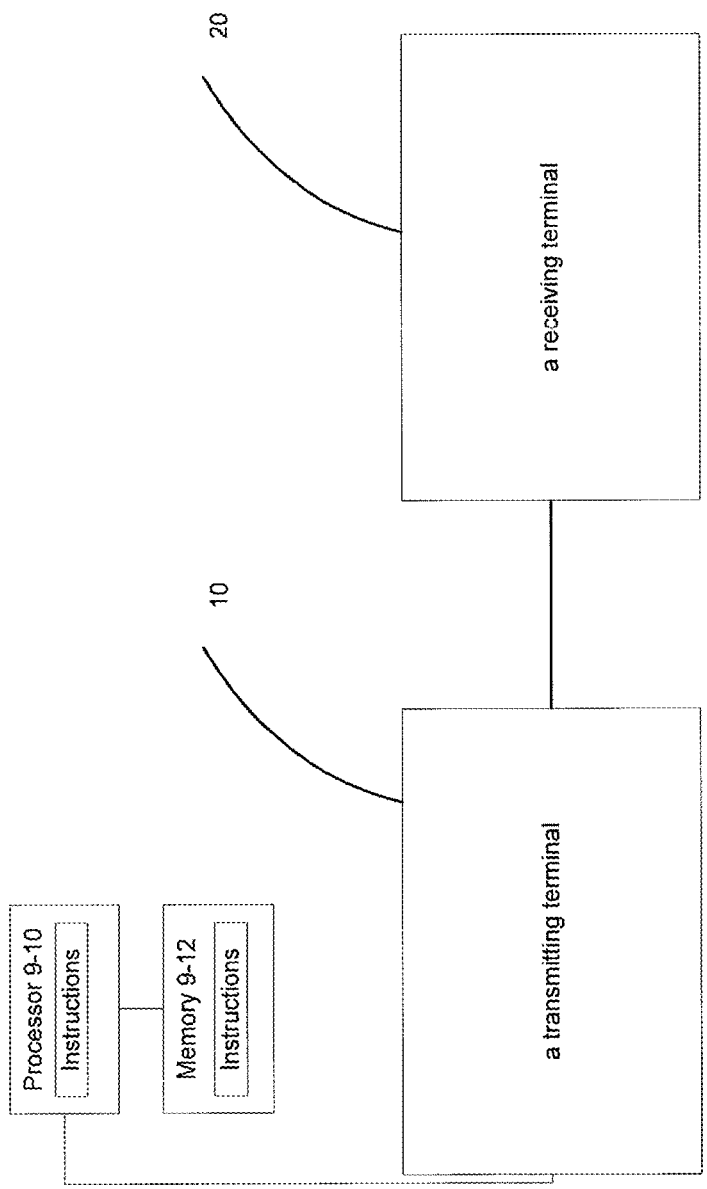
FIG. 9 shows a schematic diagram of a structure of a webpage sharing system.

In one example, as shown in FIG. 9, a webpage sharing system is disclosed, comprising a transmitting terminal 10 having memory 9-12 and to be executed by one or more processors 9-10 and a receiving terminal 20 having memory 9-12 and to be executed by one or more processors 9-10, wherein:

the transmitting terminal 10 is configured to acquire the webpage sharing instruction and to acquire the corresponding receiving terminal according to the webpage sharing instruction;

The transmitting terminal 10 is also configured to acquire the webpage identifier in the address bar of the browser and to transmit the webpage identifier to the receiving terminal;

The receiving terminal 20 is configured to receive the webpage identifier and to load the webpage, which corresponds to the webpage identifier, through calling the interface function of the browser.

In one example, the receiving terminal 20 is also configured to determine whether the browser has started or not, if not, then to display the prompt message in the notification bar.

In one example, the receiving terminal 20 is also configured to acquire the prompt message view instruction which has been input, to start the browser according to the prompt message view instruction and to load the webpage, which corresponds to the webpage identifier, through calling the interface function of the browser.

In one example, the receiving terminal 20 is also configured to display the risk prompt window, to acquire the loading confirmation instruction which has been input and to load the webpage, which corresponds to the webpage identifier, through calling the interface function of the browser.

Figure 10:
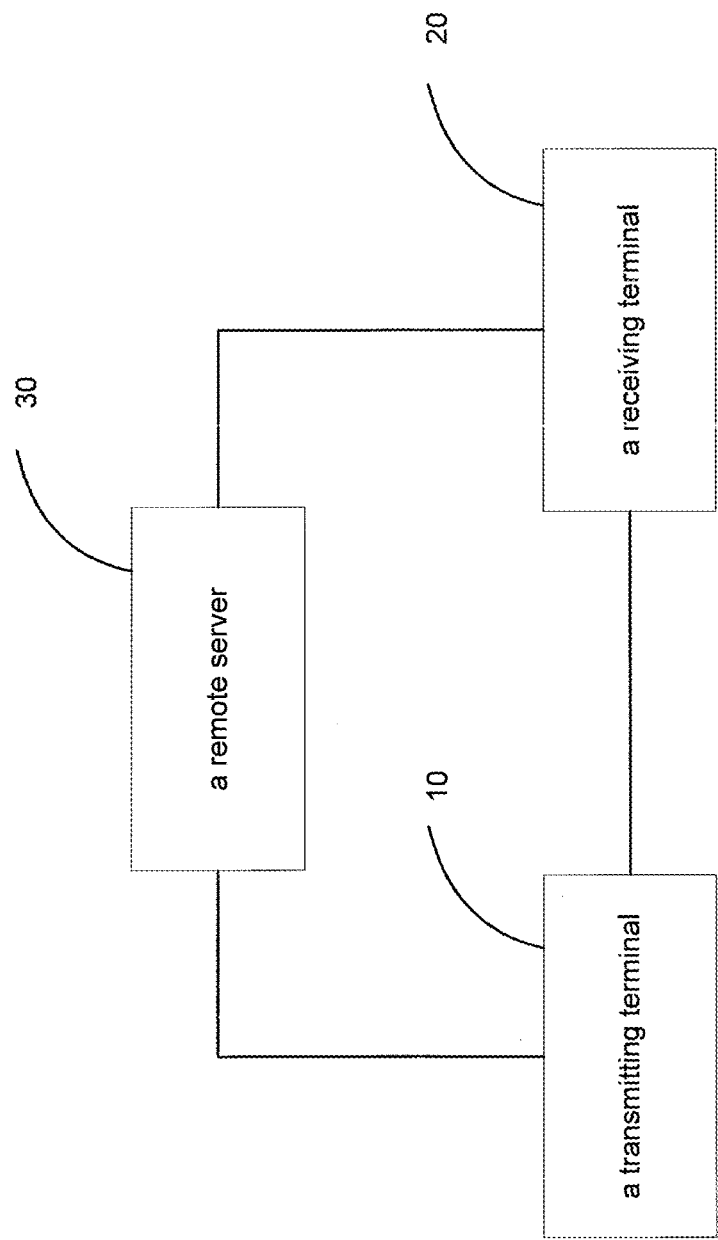
FIG. 10 shows a schematic diagram of another example of a structure of a webpage sharing system.

In one example, as shown in FIG. 10, another example of the webpage sharing system further comprises a remote server 30.

The transmitting terminal 10 is also configured to acquire the corresponding user ID according to the webpage sharing instruction, to generate the query request according to the user ID and to transmit the query request to the remote server 30.

The remote server 30 is configured to extract the user ID according to the query request which has been received, to acquire the session object which the user ID corresponds to, to read the terminal ID, which has been cached in the session object, corresponding to the user ID and to return the terminal ID to the transmitting terminal.

The transmitting terminal 10 receives the terminal ID and acquires the corresponding receiving terminal according to the terminal ID.

In one example, the transmitting terminal 10 and/or the receiving terminal 20 are/is also configured to acquire the terminal ID and the user ID which has been input, to generate the device registration request according to the terminal ID and the user ID and to transmit the device registration request to the remote server.

The remote server 30 is also configured to receive the device registration request, to extract the corresponding user ID and terminal ID, to acquire the session object, which corresponds to the user ID, and to cache the terminal ID into the session object.

In one example, the transmitting terminal 10 is also configured to acquire the local position information through the position sensor and to add the local position information into the device registration request.

The remote server 30 is also configured to add the local position information, which corresponds to the terminal ID, into the session object.

In one example, the transmitting terminal 10 is also configured to acquire the local position information through the position sensor, to generate the query request according to the local position information and to transmit the query request to the remote server 30.

The remote server 30 is also configured to extract the local position information according to the query request which has been received, to find the terminal ID at a geographic distance, which is less than a threshold value, from the local position information through traversing the session object and to return the terminal ID to the transmitting terminal.

With the above webpage sharing method, apparatus and system, the user only needs to input the webpage sharing instruction, and then the browser can automatically acquire the webpage identifier in the address bar of the browser (i.e., the link address which the webpage that the user currently browses corresponds to) and transmit the webpage identifier to the browser process of the terminal, which the webpage sharing instruction corresponds to, so that the browser of this terminal can automatically load the webpage which this webpage identifier corresponds to. In comparison with the traditional technology, the user has no need to additionally start the instant messaging tool, so no additional memory will be occupied, which can increase the memory utilization and improve the running speed of the mobile device.

Those of ordinary skill in the art may understand that the realization of the whole or partial flow in the method in the abovementioned examples may be completed through a computer program which instructs related hardware, the program may be stored in a computer-readable storage medium, and this program may comprise the flow of the examples of the abovementioned various methods at the time of execution. Wherein, the storage medium may be a disk, compact disk, read-only memory (ROM), or random access memory (RAM), etc.

Figure 11:
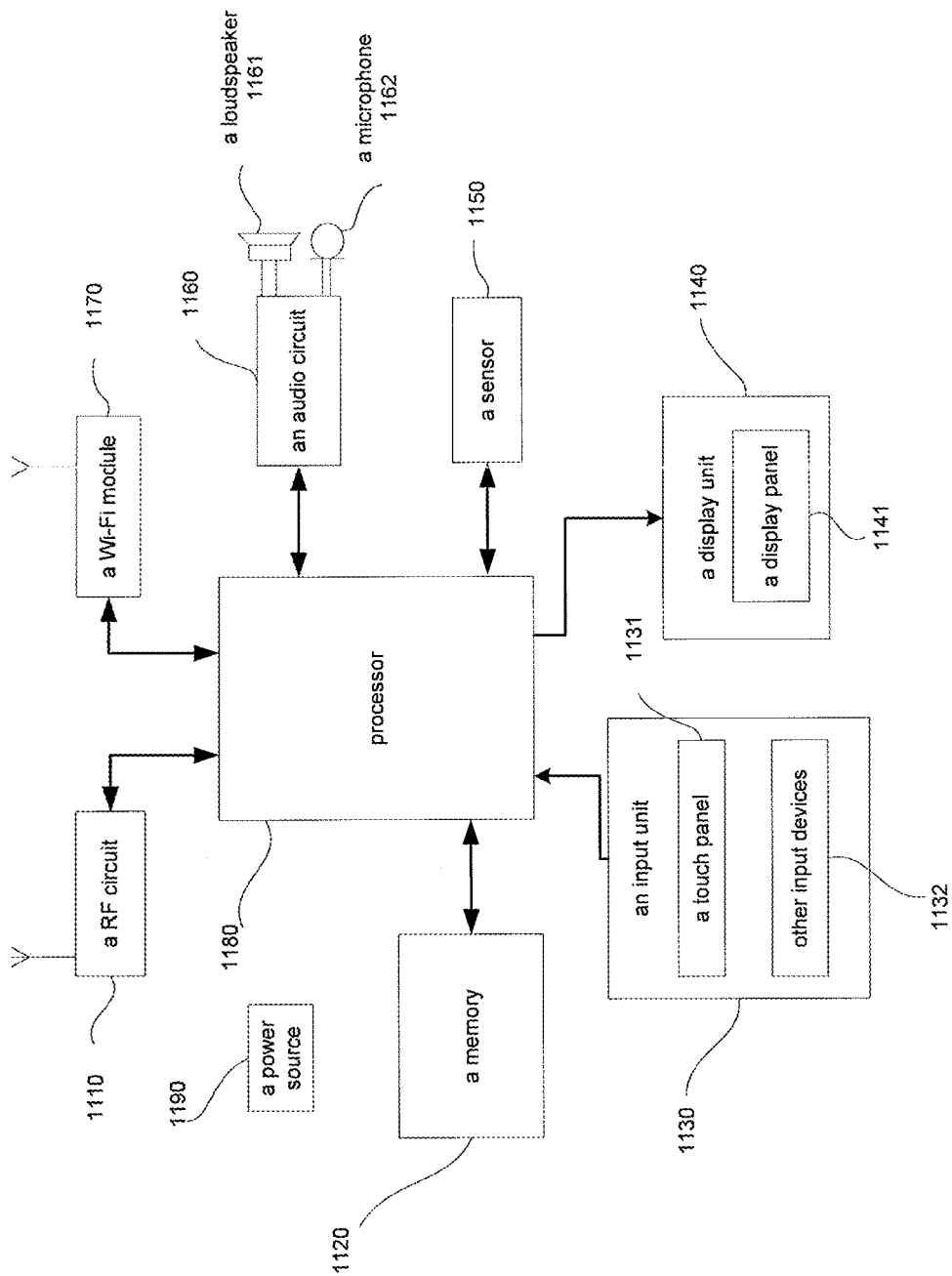
FIG. 11 shows a schematic diagram of another example a structure of a webpage sharing apparatus.

The examples of the present disclosure also disclose another webpage sharing apparatus, as shown in FIG. 11, in order to be convenient for the description, only a part related to the examples of the present disclosure is shown, and please refer to the method part in the examples of the present disclosure for specific technical details which are not disclosed. This terminal can be any terminal device, including the mobile phone, the tablet PC, a PDA (Personal Digital Assistant), a POS (Point of Sales), a car PC, etc. The following example is given with the mobile phone as the terminal:

FIG. 11 shows a block diagram of a part of a structure of a mobile phone related to the terminal disclosed in the examples of the present disclosure. With reference to FIG. 11, the mobile phone comprises the following components: a radio frequency circuit RF (Radio Frequency) 1110, a memory 1120, an input unit 1130, a display unit 1140, a sensor 1150, an audio circuit 1160, a Wi-Fi (wireless fidelity) module 1170, a processor 1180, a power source 1190, etc. Those of skill in the art may understand that as shown in FIG. 11, the structure of the mobile phone constitutes no limit to the mobile phone and can comprise the components more or less than what has been shown in the figure, or the power source combined with some components, or an arrangement of different components.

Each component of the mobile phone is specifically introduced in combination with FIG. 11 below:

The RF circuit 1110 can be configured to receive and transmit signals in the process of receiving and transmitting messages or conversations, particularly, to receive downstream information of a base station and then to transmit the downstream information to the processor 1180 for processing; in addition, to transmit designed upstream data to the base station. In general, the RF circuit comprises, but is not limited to, an antenna, at least one amplifier, a transceiver, a coupler, a low noise amplifier (LNA), a duplexer, etc. Moreover, the RF circuit 110 may also communicate with the network and other devices via wireless communication. The above wireless communication can use any communication standard or protocol, including but not limited to Global System of Mobile (GSM) communication, General Packet Radio Service (GPRS), Code Division Multiple Access (CDMA), Wideband Code Division Multiple Access (WCDMA), Long Term Evolution (LTE), E-mail, Short Messaging Service (SMS), etc.

The memory 1120 can be configured to store software programs and modules, and the processor 1180 can execute various function applications and data processing of the mobile phone through running the software programs and modules stored in the memory 1120. The memory 1120 can mainly comprise a program storage area and a data storage area, wherein the program storage area can store an operating system, an application program required for at least one function (such as a voice playing function and an image playing function), etc.; the data storage area can store data (such as audio data and a phone book), etc. created according to the use of the mobile phone. In addition, the memory 1120 can comprise a high-speed random access memory and also a nonvolatile memory, such as at least one disk memory device, a flash memory device or any other volatile solid-state memory device.

The input unit 1130 can be configured to receive numerical information or character information which has been input and to generate a key signal input related to user setting and function control of the mobile phone 1100. Specifically, the input unit 1130 can comprise a touch panel 1131 and other input devices 1132. The touch panel 1131 is also called a touch screen, and it can collect the user's touch operation (for example, the user use any appropriate object or accessory, such as a finger and a touch pen, to operate on the touch panel 1131 or nearby the touch panel 1131) on or nearby it and drive a corresponding connecting device according to a preset program. Optionally, the touch panel 1131 can comprise two parts, i.e., a touch detection device and a touch controller. Wherein, the touch detection device detects the user's touch directions and positions as well as signals brought from the touch operation and transmits the signals to the touch controller; the touch controller receives the touch information from the touch detection device, converts it into contact coordinates and then transmits the contact coordinates to the processor 1180, and it can also receive a demand made by the processor 1180 and then execute the demand. In addition, it is feasible to use a plurality of types, such as a resistance type, a capacitance type, an infrared ray type, and a surface acoustic wave type, to realize the touch panel 1131. Besides the touch panel 1131, the input unit 1130 can also comprise other input devices 1132. Specifically, other input devices 1132 can comprise, but is not limited to, one or more devices, including a physical keyboard, a function key (such as a volume control key and a switch key), a trace ball, a mouse, an operating rod, etc.

The display unit 1140 can be configured to display the information, which has been input by the user or supplied to the user, and various menus of the mobile phone. The display unit 1140 can comprise a display panel 1141, and optionally, it can use a Liquid Crystal Display (LCD), an Organic Light-Emitting Diode (OLED), etc. to configure the display panel 1141. Furthermore, the touch panel 1131 can cover the display panel 1141, when the touch panel 1131 has detected any touch operation on or nearby it, it transmits the touch operation to the processor 1180 to determine the type of the touch event, and subsequently the processor 1180 provides a corresponding visual output on the display panel 1141 according to the type of the touch event. As shown in FIG. 11, the touch panel 1131 and the display panel 1141 are used as two independent components to realize input and output functions of the mobile phone, but in some examples, it is feasible to integrate the touch panel 1131 with the display panel 1141 so as to realize the input and output functions of the mobile phone.

The mobile phone 1100 can further comprise at least one type of sensor 1150, such as an optical sensor, a motion sensor, a NFC sensor, an acceleration sensor, a position sensor, and other sensors. Specifically, the optical sensor can comprise an ambient light sensor and a proximity sensor, wherein the ambient light sensor can adjust brightness of the display panel 1141 according to brightness and darkness of the ambient light, and the proximity sensor can turn off the display panel 1141 and/or backlight when the mobile phone is moved close to the ear. As one of the motion sensors, an accelerometer can detect values of the acceleration at various directions (three axes in general), in a static state, it can detect the value and the direction of the gravity, and it can be used for applications of identifying attitudes of the mobile phone (such as switching between a landscape mode and a portrait mode, related games, and calibration of altitudes of a magnetometer), functions related to vibration recognition (such as a pedometer and stroke), etc.; for other sensors, such as a gyroscope, a barometer, a hygrometer, a thermometer, and an infrared sensor, which the mobile phone can be configured with, will not be described with unnecessary details here.

The audio circuit 1160, a loudspeaker 1161 and a microphone 1162 can supply an audio interface between the user and the mobile phone. On one hand, the audio circuit 1160 can transmit electrical signals converted from audio data, which have been received, to the loudspeaker 1161, and the loudspeaker 1161 converts the electrical signals into sound signals to be output; on the other hand, the microphone 1162 converts the sound signals, which have been collected, into the electrical signals, the audio circuit 1160 receives the electrical signals, converts the electrical signals into the audio data, outputs the audio data to the processor 1180 for processing and then transmits the audio data, which have been processed to, for example, another mobile phone via the RF circuit 1110 or outputs the audio data to the memory 1120 for further processing.

The Wi-Fi is a type of short-distance wireless transmission technology, the mobile phone can help the user receive and send E-mails, browser web webpages and access stream media through the Wi-Fi module 1170, and the Wi-Fi provides the user with an access to the wireless broadband Internet. Although the Wi-Fi module 1170 is as shown in FIG. 11, it is understandable that it is not a necessary component of the mobile phone 1100 and can be absolutely omitted according to the need, provided that the nature of the disclosure will not be modified.

The processor 1180 is a control center of the mobile phone, and it utilizes various interfaces and lines to connect various parts of the whole mobile phone and executes various functions and processing data of the mobile phone through running or executing the software programs and/or modules stored in the memory 1120 and calling the data stored in the memory 1120 so as to conduct overall monitoring of the mobile phone. Optionally, the processor 1180 can comprise one or more processing units; preferentially, the processor 1180 can be integrated with an application processor and a modem processor, wherein the application processor mainly processes the operating system, the user interface, the application program, etc., and the modem processor mainly processes the wireless communication. It is understandable that the above modem processor may not be integrated into the processor 1180.

The mobile phone 1100 further comprises the power source 1190 (such as a battery) which supplies power to each component, and preferentially, the power source can be logically connected with the processor 1180 via a power source management system so as to realize functions, such as charge, discharge, and power management, through the power source management system.

Although not shown, the mobile phone 1100 can further comprise a video camera, a Bluetooth module, etc., which will not be described with unnecessary details here.

The above described examples only express several examples of the present disclosure, the description of them is relatively specific and detailed, but it shall not be understood as any limit to the scope of the patent in accordance with the present disclosure. It should be noted that those of ordinary skill in the art can make some alternations and improvements under the precondition of not departing from the conception of the present disclosure, and all of these alternations and improvements are covered by the protective scope of the patent disclosure. Therefore, the protective scope of the patent in accordance with the present disclosure shall be subject to the attached claims.

The invention claimed is:

1. A method for sharing a webpage, comprising:
   acquiring, by a device with memory and at least one processor, a webpage sharing instruction;
   acquiring, by the device, a terminal identification (ID) corresponding to a terminal in response to the acquired webpage sharing instruction;
   acquiring, by the device, a webpage identifier that identifies at least a portion of the webpage;
   acquiring, by the device, a network address corresponding to the terminal ID, and a port of an event monitoring process for a web browser;
   determining, by the device, that the network address is not located in a subnet of the device, and creating a Wi-Fi hotspot through a Wi-Fi component and establishing a connection with the terminal through the Wi-Fi hotspot; and
   transmitting, by the device, the webpage identifier to the network address and the port of the event monitoring process for the web browser through the Wi-Fi component.

2. A webpage sharing apparatus, comprising:
   a memory storing instructions therein;
   one or more processors in communication with the memory, when executing the instructions, configured to cause the webpage sharing apparatus to:
   acquire a webpage sharing instruction;
   acquire a terminal identification (ID) corresponding to a terminal in response to the acquired webpage sharing instruction:
   acquire a webpage identifier that identifies at least a portion of the webpage;
   acquire a network address corresponding to the terminal ID, and a port of an event monitoring process that is associated with a web browser in the terminal;
   determine that the network address is not located in a subnet of the webpage sharing apparatus, and create a Wi-Fi hotspot through a Wi-Fi component and establish a connection with the terminal through the Wi-Fi hotspot; and
   transmit the webpage identifier to the network address and the port of the event monitoring process for the web browser through the Wi-Fi component.

3. A method for sharing a webpage, comparing:
   acquiring, by a transmitting terminal having memory and one or more processors, a webpage sharing instruction;
   in response to the acquired webpage sharing instruction:

acquiring, by the transmitting terminal, an user identification (ID) according to the webpage sharing instruction;

generating, by the transmitting terminal, a query request according to the user ID;

transmitting, by the transmitting terminal, the query request to a remote server having memory and one or more processors;

extracting, by the remote server, the user ID according to the query request which has been received;

acquiring, by the remote server, a session object corresponding to the user ID;

reading, by the remote server, a terminal identification (ID) for a receiving terminal which has been cached in the session object corresponding to the user ID, and returning the terminal ID to the transmitting terminal; and receiving, by the transmitting terminal, the terminal ID of the receiving terminal;

acquiring, by the transmitting terminal, a webpage identifier that identifies at least a portion of the webpage in a browser;

transmitting, by the transmitting terminal, the webpage identifier to the receiving terminal corresponding to the terminal ID;

receiving, by the receiving terminal corresponding to the terminal ID, the webpage identifier; and loading, by the receiving terminal corresponding to the terminal ID, a webpage corresponding to the webpage identifier.

4. The method for sharing webpage according to claim 3, after receiving, by the receiving terminal, the webpage identifier, further comprising:

determining, by the receiving terminal, whether the browser has started; and upon determining that the browser has not started:
displaying, by the receiving terminal, a prompt message in a notification bar;
acquiring, by the receiving terminal, a prompt message view instruction which has been input; and
starting, by the receiving terminal, the browser according to the prompt message view instruction and loading the webpage corresponding to the webpage identifier.

5. The method for sharing webpage according to claim 3, before loading, by the receiving terminal, the webpage, further comprising:

displaying, by the receiving terminal, a risk prompt window; and acquiring, by the receiving terminal, a loading confirmation instruction which has been input.

6. The method for sharing webpage according to claim 3, further comprising:

acquiring, by at least one of the transmitting terminal and the receiving terminal, the terminal ID and the user ID which has been input;

generating a device registration request according to the terminal ID and the user ID, and transmitting the device registration request to the remote server;

receiving, by the remote server, the device registration request;

extracting the user ID and terminal ID;

acquiring the session object corresponding to the user ID; and caching the terminal ID into the session object.

7. The method for sharing webpage according to claim 6, wherein generating the device registration request according to the terminal ID and user ID comprises:

acquiring, by the transmitting terminal, local position information through a position sensor; and adding the local position information into the device registration request;

wherein caching the terminal ID into the session object comprises:

adding, by the remote server, the local position information corresponding to the terminal ID into the session object.

8. The method for sharing webpage according to claim 7, wherein the acquiring, by the transmitting terminal, the receiving terminal comprises:

generating, by the transmitting terminal, the query request according to the local position information, and transmitting the query request to the remote server;

extracting, by the remote server, the local position information according to the query request which has been received, finding the terminal ID at a geographic distance which is less than a threshold value from the local position information through traversing the session object; and returning the terminal ID to the transmitting terminal.

9. A system for sharing a webpage, comprising:

a transmitting terminal having a first memory storing therein first instructions, and a first one or more processors in communication with the first memory;

a receiving terminal having a second memory storing therein second instructions , and a second one or more processors in communication with the second memory; and a remote server having a third memory storing therein third instructions, and third one or more processors in communication with the third memory;

wherein the transmitting terminal is configured to:
acquire a webpage sharing instruction;
acquires an user identification (ID) according to the webpage sharing instruction;
generates a query request according to the user ID; and
transmits the query request to the remote server;

wherein the remote server is configured to:
extract the user ID according to the query request which has been received;
acquire a session object corresponding to the user ID;
read a terminal identification (ID) for the receiving terminal which has been cached in the session object corresponding to the user ID; and
return the terminal ID to the transmitting terminal; and wherein the transmitting terminal is further configured to:
receive the terminal ID of the of the receiving terminal;
acquire a webpage identifier that identifies at least a portion of the webpage in a browser, and
transmit the webpage identifier to the receiving terminal corresponding to the terminal ID; and wherein the receiving terminal corresponding to the terminal ID is further configured to:
receive the webpage identifier; and
load a webpage corresponding to the webpage identifier.

10. The system for sharing the webpage according to claim 9, wherein the receiving teiniinal is further configured to:

determine whether the browser has started; and upon determining that the browser has not started, to:
display a prompt message in a notification bar;

acquire a prompt message view instruction which has been input;
start the browser according to the prompt message; and
load the webpage corresponding to the webpage identifier.

11. The system for sharing the webpage according to claim 9, the receiving terminal configured to:
display a risk promt window; and
acquire a loading confirmation instruction which has been input.

12. The system for sharing the webpage according to claim 9,
wherein at least one of the transmitting terminal and the receiving terminal is configured to acquires the terminal ID and the user ID which has been input, generates a device registration request according to the terminal ID and the user ID and transmits the device registration request to the remote server; and
wherein the remote server receives the device registration request, extracts the user ID and the terminal ID, acquires the session object corresponding to the user ID, and caches the terminal ID into the session object.

13. The system for sharing the webpage according to claim 12,
wherein the transmitting terminal is further configured to:
acquire local position information through a position sensor; and
add the local position information into the device registration request; and
wherein the third one or more processors, when executing the third instructions, are configured to cause the remote server to add the local position information corresponding to the terminal ID into the session object.

14. The system for sharing the webpage according to claim 13,
wherein the transmitting terminal is further configured to generate the query request according to the local position information and, and transmit the query request to the remote server; and
wherein the remote server is further configured to:
extract the local position infottnation according to the query request which has been received;
find the terminal ID at a geographic distance which is less than a threshold value from the local position infottnation through traversing the session object; and
return the terminal ID to the transmitting terminal.

* * * * *